(12) United States Patent
Kakaraparthi

(10) Patent No.: US 10,496,269 B2
(45) Date of Patent: Dec. 3, 2019

(54) METHOD AND SYSTEM FOR MEASURING AN END USER EXPERIENCE IN A VIRTUAL DESKTOP ENVIRONMENT

(71) Applicant: WIPRO LIMITED, Bangalore (IN)

(72) Inventor: Narasimha Sekhar Kakaraparthi, Hyderabad (IN)

(73) Assignee: Wipro Limited, Bangalore (IN)

( * ) Notice: Subject to any disclaimer, the term of this patent is extended or adjusted under 35 U.S.C. 154(b) by 200 days.

(21) Appl. No.: 15/475,502

(22) Filed: Mar. 31, 2017

(65) Prior Publication Data

US 2018/0284976 A1 Oct. 4, 2018

(51) Int. Cl.
*G06F 11/34* (2006.01)
*G06F 3/0488* (2013.01)
*G06Q 10/06* (2012.01)

(52) U.S. Cl.
CPC ........ *G06F 3/0488* (2013.01); *G06F 11/3452* (2013.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 10,394,590 | B2* | 8/2019 | Ghosh | |
| 2013/0042123 | A1* | 2/2013 | Smith | G06F 9/5077 713/300 |
| 2013/0254384 | A1* | 9/2013 | Wray | H04L 43/08 709/224 |
| 2014/0180666 | A1* | 6/2014 | Muttik | G06F 9/455 703/27 |
| 2016/0292611 | A1* | 10/2016 | Boe | G06Q 10/06393 |
| 2017/0046741 | A1* | 2/2017 | Hunter | G06Q 30/0275 |
| 2018/0024868 | A1* | 1/2018 | Mehta | G06F 9/5083 718/104 |

FOREIGN PATENT DOCUMENTS

JP 2001-338100 12/2001

* cited by examiner

*Primary Examiner* — Beau D Spratt
(74) *Attorney, Agent, or Firm* — Finnegan, Henderson, Farabow, Garrett & Dunner, LLP

(57) ABSTRACT

The present disclosure discloses a method and a system for measuring a User Experience (UX) in a Virtual Desktop Environment (VDE). The method comprises receiving a metric corresponding to each of one or more parameters associated with a plurality of user touchpoints in the VDE, assigning a dynamically calibrated weight to each of the one or more parameters, and calculating, a cumulative weighted score indicative of the user experience, based on weighted scores calculated for each of the plurality of user touchpoints, wherein the weighted scores for each of the plurality of user touchpoints are calculated based on the corresponding dynamically calibrated weight and the corresponding metric. The present disclosure improves user experience in the VDE.

17 Claims, 4 Drawing Sheets

METHOD AND SYSTEM FOR MEASURING AN END USER EXPERIENCE IN A VIRTUAL DESKTOP ENVIRONMENT

TECHNICAL FIELD

The present disclosure relates to virtual desktop environments. More particularly, the present disclosure relates to measuring an end user experience in a virtual desktop environment.

BACKGROUND

In virtual machines running desktop environments, contents of the virtualized desktop systems is processed and stored on a remote processing system (Ex: Server, network connected devices) rather than local host processing system. Different tasks and procedures running on the virtualized environments are very complex and consists of many data processing layers developed by multiple parties (developers, product vendors) for successful operation. Further, an end-user experience is dependent on many touch points and operations performed on the virtual desktop systems. Many a times, the end-user experience is person/product specific and it is generally measured by conducting the end-user experience surveys through online questionnaire, feedback through manually printed forms, market analysis for product, and other dedicated survey methods. In many instances, the end-user experience issues (like system slowness, system crash, connectivity issues, endpoint device configuration etc.) are related to the backend process and are neither reproducible through a user interface nor are the issues reoccurring, which can be used for analysis. Thus, many a times the end-user is not aware of the backend issues, and the surveys conducted on the end-user experience do not capture all the information. Also, analysis of the surveys may not be accurate. Hence, most of the surveys are not effective in sufficient data collection to address end-user requirement.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for measuring a User Experience (UX) in a Virtual Desktop Environment (VDE). The method comprises receiving, by a UX measuring system, a metric corresponding to each of one or more parameters associated with a plurality of user touchpoints in the VDE, assigning a dynamically calibrated weight to each of the one or more parameters, where the dynamic calibration of the weight is based on a comparison of at least a historical cumulative weighted score with a predefined reference score and calculating a cumulative weighted score indicative of the user experience, based on weighted scores calculated for each of the plurality of user touchpoints, where the weighted scores for each of the plurality of user touchpoints are calculated based on the corresponding dynamically calibrated weight and the corresponding metric.

In an embodiment, the present disclosure discloses a User Experience (UX) monitoring system. The system comprises a processor and a memory, communicatively coupled with the processor. The processor is configured to receive a metric corresponding to each of one or more parameters associated with a plurality of user touchpoints in the VDE, assign a dynamically calibrated weight to each of the one or more parameters, where the dynamic calibration of the weight is based on a comparison of at least a historical cumulative weighted score with a predefined reference score, and calculate a cumulative weighted score indicative of the user experience, based on weighted scores calculated for each of the plurality of user touchpoints, where the weighted scores for each of the plurality of user touchpoints are calculated based on the corresponding dynamically calibrated weight and the corresponding metric.

In an embodiment, the present disclosure relates to a non-transitory computer readable medium including instructions stored thereon that when processed by at least one processor cause a device to perform operations comprising receiving a metric corresponding to each of one or more parameters associated with a plurality of user touchpoints in the VDE, assigning a dynamically calibrated weight to each of the one or more parameters, wherein the dynamic calibration of the weight is based on a comparison of at least a historical cumulative weighted score with a predefined reference score, calculating a cumulative weighted score indicative of the user experience, based on weighted scores calculated for each of the plurality of user touchpoints, wherein the weighted scores for each of the plurality of user touchpoints are calculated based on the corresponding dynamically calibrated weight and the corresponding metric.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
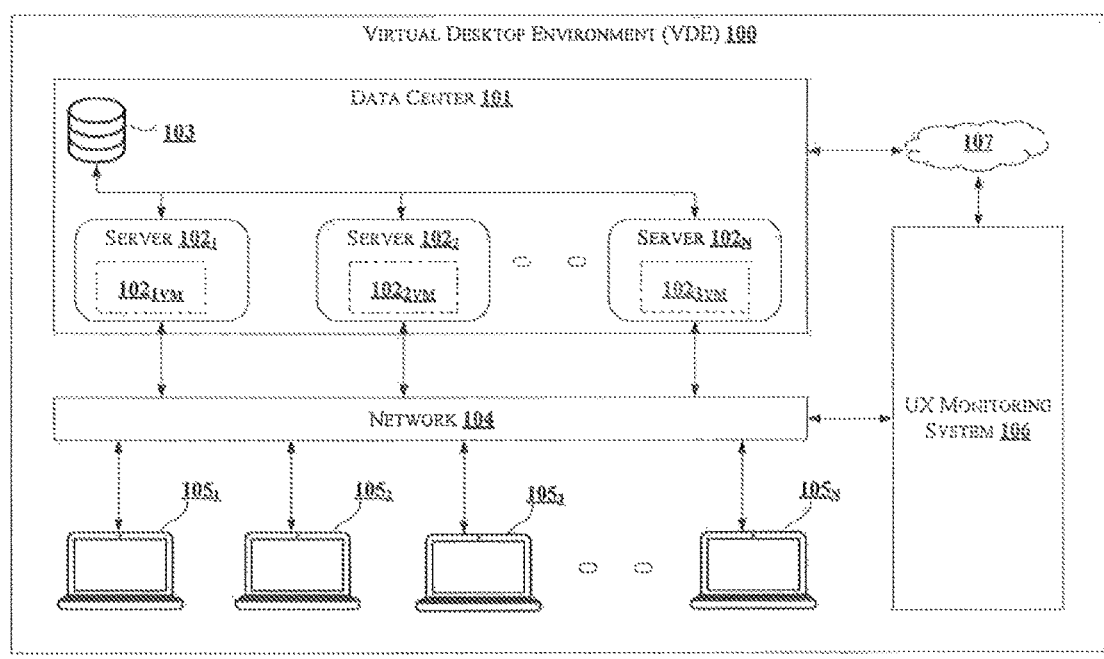
FIG. 1 shows an exemplary Virtual Desktop Environment (VDE) for measuring end-user experience in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to measuring end-user experience in a Virtual Desktop Environment (VDE). A dedicated system receives a metric of one or more parameters associated with one or more touchpoints. Further, the system assigns dynamically calibrated weight to the one or more parameters. The dynamic calibration of the weights is performed by comparing a historical cumulative score of a user experience with a predefined reference score. Furthermore, a cumulative weighted score, indicative of the user experience is calculated based on weighted scores calculated for each of the plurality of user touchpoints. Here, the weighted score for each of the plurality of user touchpoints is calculated based on corresponding dynamically calibrated weight and corresponding metric. Further, based on the cumulative weighted score, an action may be performed for improving the end-user experience.

FIG. 1 shows a Virtual Desktop Environment (VDE) 100. The VDE 100 comprises a datacentre 101, a server $102_1$, a server $102_2$, . . . , a server $102_N$, a database 103, a network 104, a user device $105_1$, a user device $105_2$, a user device $105_3$, . . . , a user device $105_N$, a user Experience (UX) monitoring system 106 and a data cloud 107. The server $102_1$, the server $102_2$, . . . , the server $102_N$, can be represented as one or more servers 102 hereafter in the present disclosure. Likewise, the user device $105_2$, the user device $105_3$, . . . , the user device $105_N$ can be represented as one or more user devices 105 hereafter in the present disclosure. Each of the one or more servers 102 hosts a Virtual Machine (VM). The VM hosted by the server $102_1$ is represented as VM $102_{1VM}$, the VM hosted by the server $102_2$ is represented by VM $102_{2VM}$, and so forth. The one or more user devices 105 may access or interact with corresponding VM using associated Input/Output devices. In an embodiment, each of the VM hosted by a server has a guest device. The guest device may be a device from the one or more devices 105. The one or more user devices 105 may perform operations on the VM, where the operations are processed by the VM of the corresponding server 105. The one or more servers 102 may be connected to the one or more user devices 105 by means of the network 104. The network may be a wired network or a wireless network. The user experience (UX) monitoring system 106 monitors one or more parameters related to a plurality of user touchpoints. The one or more parameters may be collected from various layers of the VDE 100. The UX monitoring system 106 assigns each of the one or more parameters a dynamically calibrated weight according to a predefined reference score calculated based on a user feedback on the plurality of user touchpoints. Then, recommended actions may be performed on the one or more parameters for increasing end-user experience.

In an embodiment, the one or more servers 102 may be hypervisors. The hypervisors may host a virtual operating system for the one or more user devices 105 to access the virtual operating system.

In an embodiment, the data cloud 107 may be connected to the data center 101. The data cloud 107 may store data related to running virtual operating system in the one or more servers 102. Also, the data cloud 107 may store services available for providing to the data center 101 and the one or more user devices 105. The UX monitoring system 106 may receive one or more parameters from the data cloud 107 for analysis. Further, the UX monitoring system 106 may perform one or more actions on the one or more parameters to improve user experience related to data cloud 107.

In an embodiment, the database 103 may store data related to end-users and the plurality of user touchpoints.

In an embodiment, the one or more user devices 105 may include, but are not limited, to Portable Device Assistant (PDA), laptops, mobile phone, tablets, or any other computing device.

Figure 2:
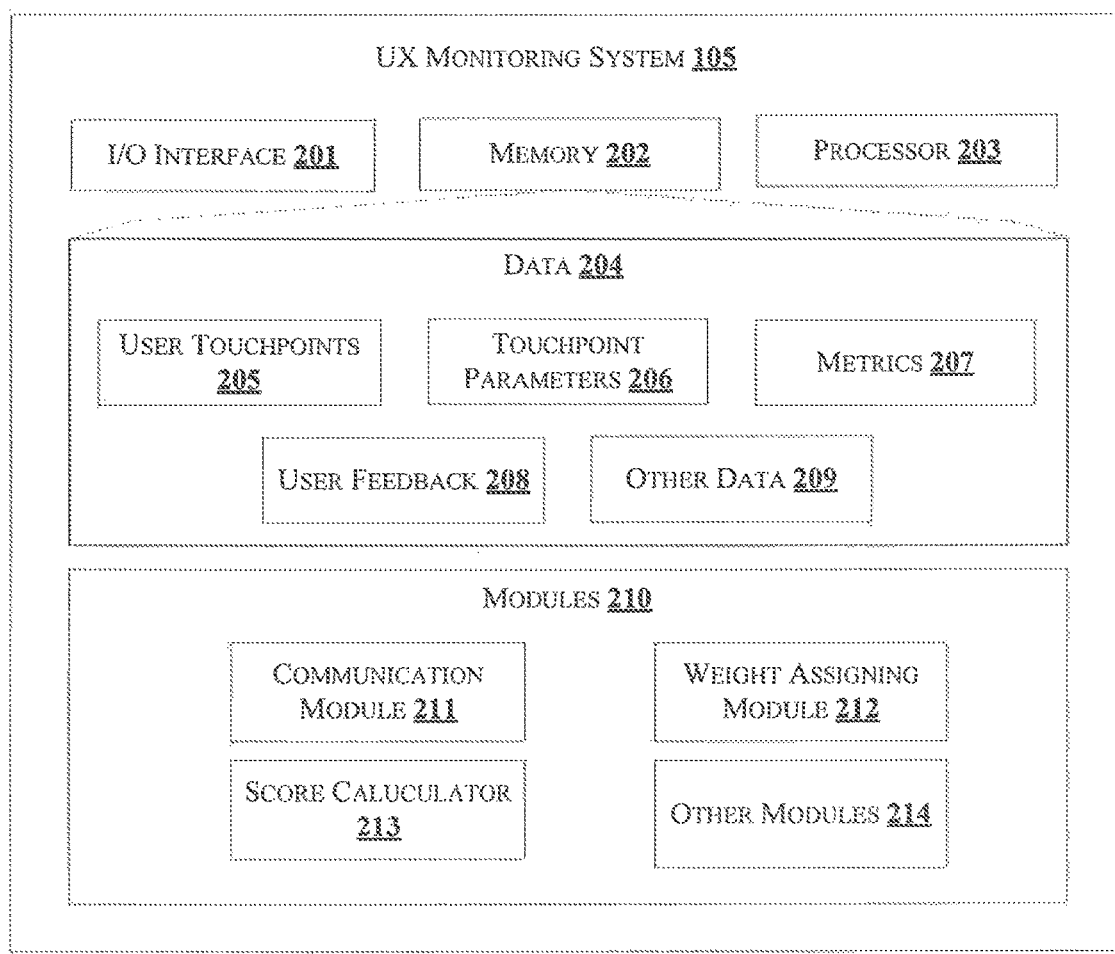
FIG. 2 shows internal architecture of a User Experience (UX) monitoring system for measuring end-user experience in a VDE in accordance with some embodiments of the present disclosure.

FIG. 2 illustrates internal architecture of the UX monitoring system 106 in accordance with some embodiments of the present disclosure. The UX monitoring system 106 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 may be communicatively coupled to the processor 203. The UX monitoring system 106 further comprises an Input/Output (I/O) interface 201. The I/O interface 201 may be coupled with the processor 203 through which an input signal or/and an output signal is communicated.

In an embodiment, data 204 may be stored within the memory 202. The data 204 may include, for example, user touchpoints 205, touchpoint parameters 206, metrics 207, user feedback 208 and other data 209.

The user touchpoints 205 are entities for which an experience of an end-user in the VDE 100 may be measured. In an embodiment, the user touchpoints 205 may include, but are not limited to, input/output systems, local devices in the VDE 100, datacentre services, external resources, user interactions, virtual operating system, applications, and virtual machine.

In an embodiment, the touchpoint parameters 206 may include parameters associated with the plurality of user touchpoints 205. The touchpoint parameters 206 may include, but are not limited to, virtual resources, networking elements, storage, CPU usage, memory usage, memory leaks, and the like. Also, the touchpoint parameters 206 may include any other parameters associated with the user touchpoints 205.

In an embodiment, the metrics 207 are values associated with each of the touchpoint parameters 206. The metrics 207 may be standardized values or user defined values.

In an embodiment, the user feedback 208 may include data related to the user touchpoints 205 received from a particular user or a particular user group. For example, the feedback data may include improvement required in a user touchpoint 205, a complaint on a user touchpoint 205, a compliment of a user touchpoint 205, and the like.

In an embodiment, the other data may include historical weights assigned to the touchpoint parameters 206. Further, the other data 209 may include calibrated weights assigned to a particular user or particular user group.

In an embodiment, the data 204 in the memory 202 is processed by modules 210 of the UX monitoring system 106. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 210 when configured with the functionality defined in the present disclosure will result in a novel hardware.

In one implementation, the modules 210 may include, for example, a communication module 211, a weight assigning module 212, a score calculator 213 and other modules 214. It will be appreciated that such aforementioned modules 210 may be represented as a single module or a combination of different modules.

In an embodiment, the communication module 211 receives a metric 207 corresponding to the touchpoint parameters 206 associated with a user touchpoint 205. The metric 207 maybe received from dedicated hardware or firmware monitoring the touchpoint parameters 206. In an embodiment, the metric 207 is normalized based on a predefined scale. Further, the metric 207 may be received at predefined time intervals. Also, the metric 207 may be validated based on a set of predefined values.

In an embodiment, the weight assigning module 212 assigns a dynamically calibrated weight to the touchpoint parameters 206. The dynamically calibrated weight is determined by comparing a historical weighted score of the touchpoint parameters 206 and a predefined reference score. The comparison provides a difference between the historical weighted score of the touchpoint parameter 206 and the predefined reference score. The difference is used to calibrate a historical weight assigned to the touchpoint parameters 206 and the calibrated weight is assigned to the touchpoint parameters 206.

In an embodiment, predefined reference score is calculated based on one or more of: an analysis of experience of a user performed by mirroring the VDE of the user at backend of the VDE, an analysis of experience of user based on one or more inputs received from the user, a deep learning performed on historical cumulative weighted scores.

In an embodiment, the score calculator 213 calculates a weighted score for each of the touchpoint parameters 206, based on weighted scores calculated for each of the plurality of user touchpoints. The weighted scores for each of the plurality of user touchpoints are calculated based on the corresponding dynamically calibrated weight and the corresponding metric. Further, the score calculator aggregates the weighted score of each of the touchpoint parameters 206 to determine a cumulated weighted score. The cumulative weighted score may be used to perform an action on the touchpoint parameters 206. In an embodiment, the action may be identified from a set of actions to be performed based on the cumulated weighted score. The action may be identified when the calculated cumulative score varies by a predefined threshold from the predefined reference score. The action is performed to enhance the end-user experience.

In an embodiment, the other modules 214 may include, but are not limited to, a normalization module, a validation module, a user experience enhancer, a report generation module, and the like. The normalization module may be used to normalize the metric 207. The validation module may be used to validate the metric 207. The user experience enhancer may be used to perform an action to enhance the end-user experience. The report generation module may generate a report of the UX monitoring system 106.

Figure 3:
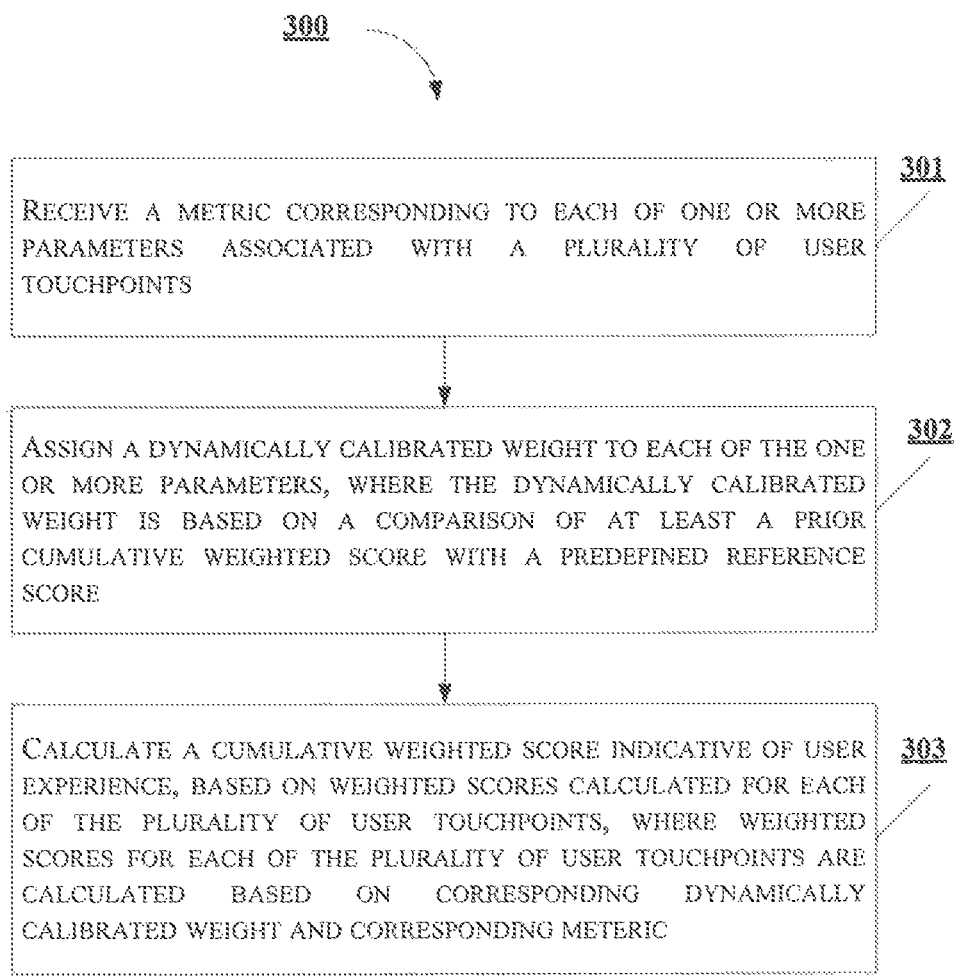
FIG. 3 shows an exemplary flow chart illustrating method steps for measuring end-user experience in a VDE in accordance with some embodiments of the present disclosure.

FIG. 3 shows a flow chart illustrating a method for monitoring end-user experience in the VDE 100, in accordance with some embodiments of the present disclosure.

As illustrated in FIG. 3, the method 300 may comprise one or more steps for monitoring end-user experience in the VDE 100, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, receiving a metric 207 corresponding to each of the touchpoint parameters 206 by the communication module 211. The communication module receives the metric 207 from the dedicated hardware or firmware. In an embodiment, the dedicated hardware or firmware may belong to the UX monitoring system 106.

The metric corresponds to the touchpoint parameters 206 associated with the plurality of user touchpoints 205. The user touchpoints 205 are explained below:

Input/Output (I/O) systems are considered as touchpoint. I/O devices such as keyboard, mouse, touch screens, screen and the like may be considered as touchpoint parameters 206. I/O signals like keyboard inputs, mouse clicks from the one or more user devices 105 are transferred to the one or more servers 102 over a remote desktop protocol. The I/O signals are received by the one or more servers 102 hosting the VM and are processed by the one or more servers 102. In an embodiment, the one or more servers 102 may include dedicated modules to process the I/O signals. Upon processing the I/O signals, output is again fed back to the one or more user devices 105. As data transfer happens over the network 104 and data processing happens at the data center 101, response to user moving a mouse may not instantly reflect on the screen. The delay is very apparent and annoying over slow connections and this impacts user experience considerably. Thus, I/O systems is considered as a touchpoint.

Local devices are considered as a user touchpoint 205. Devices connected to the one or more user devices 105 and usage is restricted by the enterprise policies. For instance, local storage drives may be prohibited by security rules imposed on the local devices. Policies such as Group Policy Object (GPO), desktop delivery specific policies need to be monitored, when such policies conflict with end-user needs. Here, the GPO and desktop delivery specific policies may be considered as touchpoint parameters 206.

Data center 101 is considered as a user touchpoint 205. Delays involved in interactions with backend services such as authentication, central policy systems (such as GPO), profile managers, file shares are important factors that influence user experience. For example, long log on times can result from scripts, policies applicable during log on times. Here, end-user must wait and cannot use desktop until aforesaid operations are performed. Here, the central policy systems, profile managers, files shares, and log on time can be considered as the touchpoint parameters 206.

External resources (cloud drives, collaboration services) are considered as a user touchpoint 205. There are limitations to use data cloud 107 storages in virtual desktops. Collaboration service utilization need optimization mechanisms and user may suffer without using the cloud 107 storages. Here, the cloud 107 storage, collaboration and service may be considered as the touchpoint parameters 206.

User interactions with self-service portals is considered as a user touchpoint 205. Self-service portals, storefront services enable the virtual desktop session to the user. Delays in response, multiple attempts (such as multiple clicks on resource icons), session launch failures, brokering mechanism failures and the like, result in poor experience to the end-user. The delays in response, multiple attempts, session parameters, and brokering mechanism may be considered as the touchpoint parameters 206 corresponding to the user interactions with self-service portals.

Operating System storage is considered as a user touchpoint 205. Input Output Operation Per Second (TOPS), disk que length results in slow OS response. Thus, the IOPS and disk que length may be considered as the touchpoint parameters 206.

Applications of the virtual operating system is considered as user touchpoints 205. Application delivery mechanism, location of application execution, delay in accessing dependent services (such as data bases, web services) impact user experience. The application delivery mechanism, location of application execution, access time of dependent services may be considered as touchpoint parameters 206.

Virtual Machine is considered as user touchpoint 205. Virtualization enables sharing of hardware resources by multiple virtual machines. Quality of Service parameters help in avoiding one single user to hijack all system resources. Resource usage and sharing are critical factors to be observed. Thus, the resources may be considered as the touchpoint parameter 206.

At step, 302, assigning a dynamically calibrated weight to each of the touchpoint parameters 206 associated with the user touchpoint 205. The weight assigning module 212 assigns a dynamically calibrated weight to the touchpoint parameters 206 based on a comparison between a historical cumulative weighted score and a predefined reference score. Here, the historical cumulative weighted score indicates a sum of, weighted scores that is associated with each of the touchpoint parameters 206. The comparison provides a difference of score, based on the difference score, the weight assigning module 212 dynamically assigns a calibrated weight to the touchpoint parameters 206 such that value of the difference score reduces. In an embodiment, calibration of the weight may occur at predefined interval of time.

In an embodiment, the predefined reference score is determined based a feedback received on user touchpoints 205 from an end-user. Alternatively, the predefined reference score may be determined using machine learning algorithms using historical data of weights assigned to the touchpoint parameters 206. In an embodiment, the feedback may be performed manually using a questionnaire.

At step 303, calculating a cumulative weighted score for the touchpoint parameters 206. The score calculator 213 calculates a weighted score for each of the touchpoint parameters 206 by multiplying corresponding metric 207 and corresponding dynamic weight. Below formulae indicates calculation of the cumulative weighted score:

$$(\text{Weighted Score})_i = (\text{Metric})_i * (\text{Weight})_i \tag{1}$$

$$\text{Cumulative Weighted Score} = \Sigma_{i=0}^{n}(\text{Weighted Score})i \tag{2}$$

In an embodiment, the cumulative weighted score for a given cycle may be considered as a historical cumulative weighted score in a subsequent cycle. For example, a cumulative weighted score calculated at a first cycle may be considered as historical cumulative weighted score for second cycle.

For instance, let us consider network as a user touchpoint. Let network latency be a touchpoint parameter 206. The network latency is associated with a metric. Let a metric of 1 be associated with the network latency, when the network latency is below 20 ms, a metric of 0.8 be associated when the network latency is between 20 ms and 100 ms, a metric of 0.5 be associated when the network latency is between 100 ms and 200 ms, and a metric of 0.3 be associated when the network latency is above 200 ms. Let a weight of 4 be associated with the network latency. For a cycle of 5 minutes, let the network latency vary between 20 ms and 60 ms. Thus, corresponding metric applicable are 1 and 0.8. Thus, weighted score for the parameter network latency for the cycle is calculated as $((4*1)+(4*0.8))/2=3.6$. Likewise, for the given cycle, a score is calculated for various touchpoint parameters 206. For example, let us consider another touchpoint User Interface (UI) having a weight of 3 and a metric of 2.2, thus resulting in a weighted score of $3*2.2=6.6$. The cumulative weighted score for the touchpoints network and UI is $3.6+6.6=10.2$. Let a user feedback be received, and the user prefers that network has to improve. A weighted score based on the user feedback is calculated, and the weighted score is considered as a reference score. The calculated cumulative weighted score is compared with the reference score. Based on the comparison, the weight associated with the network is calibrated. Let us assume, that new weight to be assigned to the network is 5. Thus, the weight has to be calibrated from 4 to 5. The UX monitoring system 106 calibrates the weight and assigns the calibrated weight to the touchpoint parameter. Further, the UX system calculates a new cumulative weighted score based on the calibrated weight. When the cumulative weighted score varies by a predefined threshold value from the predefined reference score, an appropriate action may be identified to perform on the touchpoint parameters 206.

In an embodiment, the appropriate actions may be triggered to remediate issues related to user experience and improve the user experience. The actions may be identified based on the user touchpoints 205 having low weighted scores. For example, in case of low IOPS resulting in virtual machine responding slowly, storage boost solutions can be adapted. Usage of solid state hard disks in memory disk emulators, and auto tiering are typical examples of storage boost. In case of low network bandwidth, the remote protocol can be fine-tuned to use optimal encoding methods. In case the logon is taking more time, resulting in poor user experience, logon scripts, policies, profile can be optimized to reduce logon time. Likewise, based on the user touchpoints 205, the appropriate actions are identified.

In an embodiment, the UX monitoring system 106 may use machine learning algorithms to determine predefined reference score using historical data. Thus, the UX system may self-calibrate using the historical data and may not depend on user feedback. Thus, an adaptive method may be used for self-calibrating the weights. Here, the UX monitoring system 106 may receive data 204 at predefined intervals of time to identify dependencies and correct measurements for increasing user experience. Alternatively, the user may be shadowed by an administrator and the administrator may determine user's preference of the user touchpoints 205 at predefined intervals of time. Further, the administrator may provide the user's preference to the UX monitoring system 106. Based on the user's preference of the user touchpoints 205, the UX monitoring system 106 calibrates the weights to improve user experience in the VDE 100.

In an embodiment, feedback may be received from a particular user or a particular user group. A weighted score may be calculated for the particular user or the particular user group. Further, calibration of the weight may be performed for the particular user or the particular user group. Further, an action may be performed to affect the particular user or the particular user group. In an embodiment, performance of the UX monitoring system 106 may be analyzed based on weighted score of the particular user or the particular user group.

In an embodiment, the UX monitoring system 106 may generate report regarding results of the UX monitoring system 106. The report may be used to compare users or user groups. The reports along with comparison may be stored in the database 103. The comparison may serve as historical data, which are used for self-calibration of weights.

In an embodiment, the metrics are validated to check consistency and skewness. The UX monitoring system 106 may employ existing methods for validation.

In an embodiment, the UX monitoring system may use weighted summation or complex polynomials to determine user experience of the end-user.

Computer System

Figure 4:
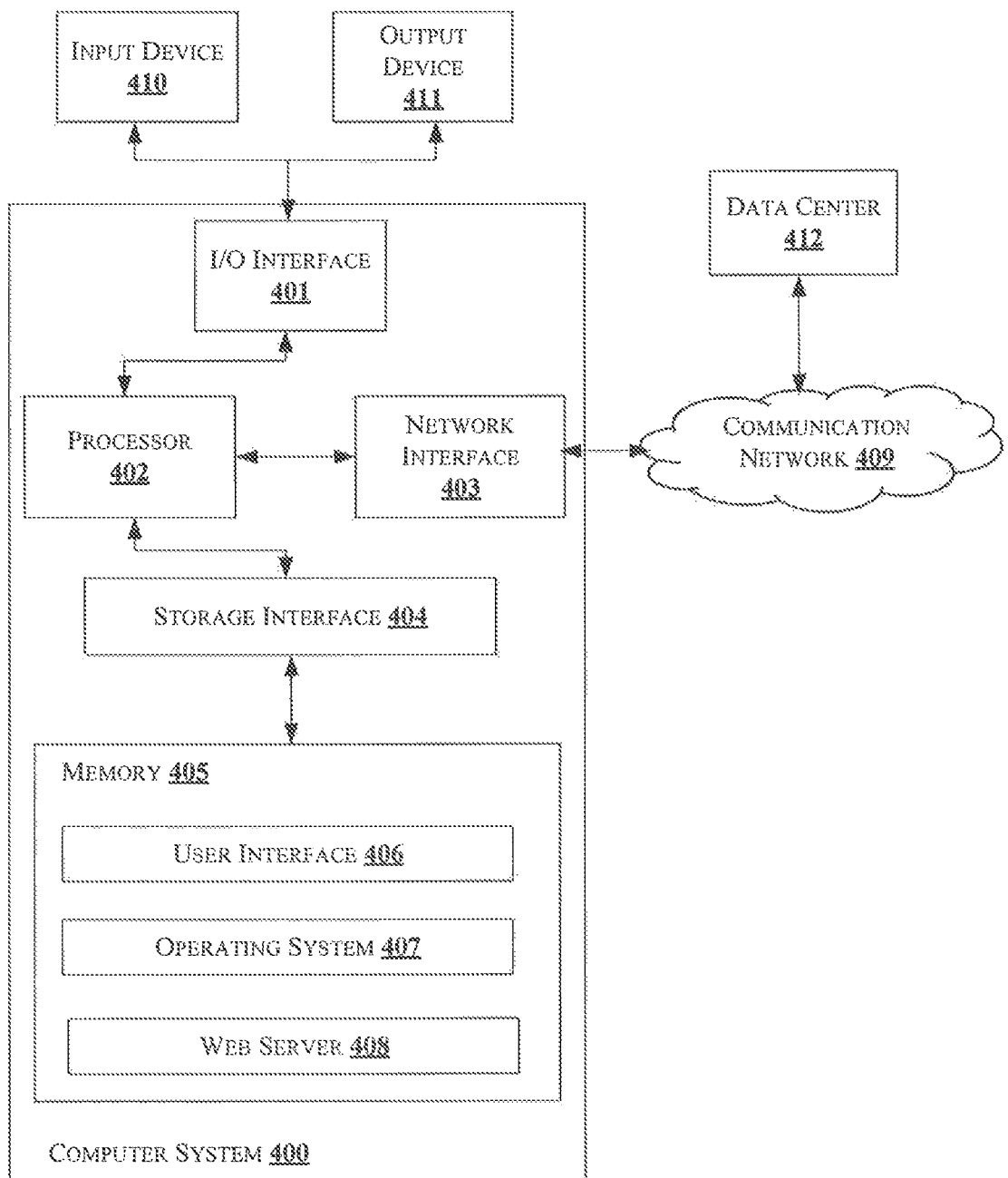
FIG. 4 shows a general-purpose computing system for measuring end-user experience in a VDE in accordance with some embodiments of the present disclosure.

FIG. 4 illustrates a block diagram of an exemplary computer system 400 for implementing embodiments consistent with the present disclosure. In an embodiment, the computer system 400 is used to implement the method for measuring end-user experience in the VDE 100. The computer system 400 may comprise a central processing unit ("CPU" or "processor") 402. The processor 402 may comprise at least one data processor for executing program components for dynamic resource allocation at run time. The processor 402 may include specialized processing units such as integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices. For example, the input device 410 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 411 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 is connected to the service operator through a communication network 409. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 409 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 403 and the communication network 409, the computer system 400 may communicate with the one or more service operators.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, web server 408 etc. In some embodiments, computer system 400 may store user/application data 406, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 400 may implement a web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

In an embodiment, the computer system 400 may be associated with a data centre 412 comprising one or more servers. The computer system 400 may communicate with the one or more servers over the communication network 409.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a method and system for improving user experience in a VDE by dynamically calibrating weights associated with user touchpoints.

In an embodiment, the disclosed system and method provides personalized user experience to a particular user or a particular user group.

In an embodiment, the system may be self-calibrated using machine learning algorithms, thus in person interviews with user can be avoided.

In an embodiment, the disclosed system can be used to provide solutions to developers to improve user experience.

In an embodiment, the disclosed system and method helps mitigate VDE bottlenecks.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Virtual Desktop Environment |
| 101 | Data center |
| 102 | Server |
| 103 | Database |
| 104 | Network |
| 105 | User device |
| 106 | UX monitoring system |
| 107 | Cloud |
| 201 | I/O interface |
| 202 | Memory |
| 203 | Processor |
| 204 | Data |
| 205 | User touchpoints |
| 206 | Touchpoint parameters |
| 207 | Metrics |
| 208 | User feedback |
| 209 | Other data |
| 210 | Modules |
| 211 | Communication module |
| 212 | Weight assigning module |
| 213 | Score calculator |
| 214 | Other modules |
| 400 | Computer system |
| 401 | I/O Interface |
| 402 | Processor |
| 403 | Network interface |
| 404 | Storage interface |
| 405 | Memory |
| 406 | User Interface |
| 407 | Operating system |
| 408 | Web interface |
| 409 | Communication network |
| 410 | Input devices |
| 411 | Output devices |
| 412 | Data center |

What is claimed is:

1. A method for measuring a User Experience (UX) related to backend process in a Virtual Desktop Environment (VDE), comprising:
   receiving, by a UX measuring system, a metric corresponding to each of one or more touchpoint parameters associated with a plurality of user touchpoints in the VDE, wherein the one or more touchpoint parameters are indicative of virtual resources and system resources associated with the VDE;
   analyzing a current experience of a user by monitoring a created mirrored copy of the current experience running on a backend of the VDE;
   calculating a reference score based on the analysis of the current experience of the user;
   assigning, by the UX measuring system, a dynamically calibrated weight to each of the one or more touchpoint parameters, wherein the dynamic calibration of the weight is based on a comparison of at least a historical cumulative weighted score with the reference score;
   calculating, by the UX measuring system, a cumulative weighted score indicative of the user experience, based on weighted scores calculated for each of the plurality of user touchpoints, wherein the weighted scores for each of the plurality of user touchpoints are calculated based on the corresponding dynamically calibrated weight and the corresponding metric; and
   triggering, by the UX measuring system, one or more actions with respect to the one or more touchpoint parameters when the cumulative weighted score is less than the reference score, wherein the one or more actions are performed to remediate issues in a backend process in the VDE.

2. The method of claim 1, wherein the received metric is normalized based on a predefined scale.

3. The method of claim 1, wherein the metric is received at predefined time intervals.

4. The method of claim 1, wherein the metric is validated based on a set of predefined values.

5. The method of claim 1, wherein the reference score is further calculated based on one of: the analysis of the experience of the user based on one or more inputs received from the user, and a deep learning performed on the historical cumulative weighted scores.

6. The method of claim 1, wherein the plurality of user touchpoints comprises at least one of: input/output systems, local devices associated with the VDE, datacenter services, external resources of the VDE, user interactions with self-service portals, operating system, applications of the VDE, and resources available for virtual machine.

7. A User Experience (UX) measuring system, comprising:
   a processor; and
   a memory, communicatively coupled with the processor comprising processor executable instructions, which, on execution causes the processor to:
      receive a metric corresponding to each of one or more touchpoint parameters associated with a plurality of user touchpoints in a Virtual Desktop Environment (VDE), wherein the one or more touchpoint parameters are indicative of virtual resources and system resources associated with the VDE;
      analyze a current experience of a user by monitoring a created mirrored copy of the current experience running on a backend of the VDE;
      calculate a reference score based on the analysis of the current experience of the user;
      assign a dynamically calibrated weight to each of the one or more touchpoint parameters, wherein the dynamic calibration of the weight is based on a comparison of at least a historical cumulative weighted score with the reference score;
      calculate a cumulative weighted score indicative of the user experience, based on weighted scores calculated for each of the plurality of user touchpoints, wherein the weighted scores for each of the plurality of user touchpoints are calculated based on the corresponding dynamically calibrated weight and the corresponding metric; and
      trigger one or more actions with respect to the one or more touchpoint parameters when the cumulative weighted score is less than the reference score, wherein the one or more actions are performed to remediate issues in backend a process in the VDE.

8. The UX measuring system of claim 7, wherein the received metric is normalized based on a predefined scale.

9. The UX measuring system of claim 7, wherein the metric is received at predefined time intervals.

10. The UX measuring system of claim 7, wherein the metric is validated based on a set of predefined values.

11. The UX measuring system of claim 7, wherein the reference score is further calculated based on one of: the analysis of the experience of the user based on one or more inputs received from the user, and a deep learning performed on the historical cumulative weighted scores.

12. The UX measuring system of claim 7, wherein the plurality of user touchpoints comprises at least one of: input/output systems, local devices associated with the VDE, data center services, external resources of the VDE, user interactions with self-service portals, operating system, applications of the VDE, and resources available for virtual machine.

13. A non-transitory computer readable medium including instructions stored thereon that when processed by at least one processor cause a device to perform operations comprising:
   receiving a metric corresponding to each of one or more touchpoint parameters associated with a plurality of user touchpoints in a Virtual Desktop Environment (VDE), wherein the one or more touchpoint parameters are indicative of virtual resources and system resources associated with the VDE;
   analyzing a current experience of a user by monitoring a created mirrored copy of the current experience running on a backend of the VDE;
   calculating a reference score based on the analysis of the current experience of the user;
   assigning a dynamically calibrated weight to each of the one or more touchpoint parameters, wherein the dynamic calibration of the weight is based on a comparison of at least a historical cumulative weighted score with the reference score;
   calculating a cumulative weighted score indicative of the user experience, based on weighted scores calculated for each of the plurality of user touchpoints, wherein the weighted scores for each of the plurality of user touchpoints are calculated based on the corresponding dynamically calibrated weight and the corresponding metric; and
   triggering one or more actions with respect to the one or more touchpoint parameters when the cumulative weighted score is less than the reference score, wherein the one or more actions are performed to remediate issues in a backend process in the VDE.

14. The medium of claim 13, wherein the received metric is normalized based on a predefined scale.

15. The medium of claim 13, wherein the metric is received at predefined time intervals.

16. The medium of claim 13, wherein the metric is validated based on a set of predefined values.

17. The medium of claim 13, wherein the reference score is further calculated based on one of: the analysis of the experience of the user based on one or more inputs received from the user, and a deep learning performed on the historical cumulative weighted scores.

* * * * *